United States Patent Office 2,740,737
Patented Apr. 3, 1956

2,740,737

MELAMINE-FORMALDEHYDE LAMINATING SYRUP

Curtis Elmer and Thomas Anas, Springfield, and Stuart H. Rider, Longmeadow, Mass., assignors to Monsanto Chemical Company, St. Louis, Mo., a corporation of Delaware No Drawing. Application July 6, 1954, Serial No. 441,673

8 Claims. (Cl. 154—43)

This invention relates to laminating resins. More particularly, the invention relates to laminating resins having increased flow at lower volatiles content.

In the preparation of laminates and especially paper laminates made from a plurality of laminae, the volatile or moisture content of the laminae before pressing is a major problem. The volatiles, usually water but sometimes organic solvents, must be removed from the final laminate and if they constitute too great a percentage of the weight of the impregnated paper, they cause poor adhesion, blow holes, poor gloss, high moisture absorption, and other serious defects. However, if the volatiles are reduced before lamination to a level at which these properties are at their optimum level, the resins do not flow out evenly in the laminating process.

One of the major advances in this field has been the introduction of laminating resins prepared from melamine, toluene sulfonamide and formaldehyde. These resins have sufficient flow near optimum volatiles content to yield a good laminate a greater part of the time. However, there is frequent failure to produce good laminates with these resins even under carefully controlled conditions.

One object of this invention is to provide new laminating resins.

Another object is to provide laminating resins having increased flow at optimum volatiles content.

A further object is to provide laminates at least the topmost layer of which is impregnated with and bonded to the remainder of the laminate with a modified melamine-toluene sulfonamide-formaldehyde resin.

These and other objects are attained by modifying melamine-toluene sulfonamide-formaldehyde resins with from 0.0006 to 0.006 mol of ammeline, ammelide, cyanuric acid or mixtures thereof per mol of melamine.

The following examples are given in illustration and are not intended as limitations on the scope of this invention. Where parts are mentioned, they are parts by weight.

EXAMPLE I

Disperse 126 parts (one mol) of melamine, 202 parts (about 2.5 mols) of formaline (37% formaldehyde) and 0.5 part (about 0.004 mol) of ammeline in 60 parts of water and adjust the pH of the dispersion to about 8.5 with sodium hydroxide. Heat the dispersion with constant agitation at reflux temperature and atmospheric pressure for about 30 minutes. Add to the reaction medium, 40 parts (about 0.25 mol) of p-toluene sulfonamide and reduce the pH of the medium to 7-8 with formic acid. Continue heating the reaction mixture at reflux temperature and atmospheric pressure until a cloud point of 10–20° C. is reached. Cool and filter.

The product of Example I is an aqueous solution of a co-condensation product of melamine, ammeline, p-toluene sulfonamide and formaldehyde. The condensation product may be recovered from solution by conventional drying methods such as spray drying, oven drying, etc. The dried resin may be used as a soft-flow molding powder but its flow properties are particularly suitable for preparing laminates from paper, wood, cloth, etc.

To prepare laminates, the resins are normally dissolved in water or a mixture of water and an aliphatic alcohol such as methanol, ethanol, propanol, isopropanol, the various butanols, etc. For best results, from 20 to 30 parts of alcohol are used for every 100 parts of water. The resin content of the solution should range from 40 to 60% by weight.

One method of preparing laminates especially for test purposes is as follows:

EXAMPLE II

Impregnate 4 mil rayon-rag paper with a 60% solids solution of the co-condensation product of Example I in a water-ethanol (100–20) solvent by dipping the paper in the solution and withdrawing it slowly therefrom over a scraper bar or through metering rolls to remove excess solution. Cut the wet impregnated paper into a plurality of 1⅝ inch circular pieces. Divide the circles into five sets of twelve each. Dry each set for a different period of time in a circulating air oven at 120° C.

To laminate the circles and test flow properties of the resin, superimpose the twelve circles in each set into a stack. Weigh the stack. Laminate the stack under a pressure of 1000 p. s. i. at 150° C. for 3 minutes. Cool the laminate, cut off the flash, i. e., the resin which has flowed out beyond the periphery of the laminate and weigh the trimmed laminate. The flow of the resin is calculated by dividing the weight of the flash by the total weight of the original compressed stack.

Table I sets forth the results obtained with the reaction product of Example I as compared with a reaction product of melamine, p-toluene sulfonamide and formaldehyde without the addition of ammeline.

Table I

|  | A | B | A¹ | B¹ | A² | B² | A³ | B³ | A⁴ | B⁴ |
|---|---|---|---|---|---|---|---|---|---|---|
| Drying Time (Minutes @ 120° C.) | 5 | 5 | 10 | 10 | 15 | 15 | 20 | 20 | 25 | 25 |
| Flow, Percent | 40 | 35 | 28 | 22 | 20 | 13 | 14 | 8 | 8 | 4.5 |
| Volatiles | 6.3 | 6.1 | 5.1 | 5.0 | 4.4 | 4.4 | 4.0 | 4.0 | 3.3 | 3.3 |

A is the co-condensate of melamine, p-toluene sulfonamide, ammeline and formaldehyde.
B is the co-condensate of melamine, p-toluene sulfonamide and formaldehyde.

The data in Table I show that the inclusion of ammeline in the co-condensation product of melamine, p-toluene sulfonamide and formaldehyde yields a product having a greater flow at high volatiles content and that the differential in flow becomes greater as the volatiles are decreased.

EXAMPLE III

Prepare a series of resins as shown in Example I but replacing the ammeline with ammelide or cyanuric acid. Make and test laminates as shown in Example II. The results obtained are set forth in Table II.

Table II

|  | C | D | E |
|---|---|---|---|
| Volatiles, Percent | 3.3 | 3.3 | 3.3 |
| Flow, Percent | 8.5 | 11.0 | 4.5 |

C contains 0.006 mol of ammelide.
D contains 0.002 mol of cyanuric acid.
E contains no additive.

The resins of this invention are co-condensation products of formaldehyde, melamine, o-, p-, or m-toluene sulfonamide or mixtures thereof and ammeline, ammelide, cyanuric acid or mixtures thereof. Based on one mol of melamine, the formaldehyde should be restricted to from 2 to 5 mols, the toluene sulfonamide to from 0.1 to 1.0 mol and the ammeline, ammelide, cyanuric acid or mixtures thereof, to from 0.0006 to 0.006 mol, respectively.

The formaldehyde is most conveniently used in the form of formalin which is a 37% aqueous solution of formaldehyde. Pure formaldehyde or its polymers, paraformaldehyde and trioxymethylene, may be used.

The reaction should be carried out by reacting together the melamine, ammeline, ammelide, cyanuric acid or mixtures thereof and formaldehyde at a pH of from 8 to 10 until partial condensation has occurred and then adding the toluene-sulfonamide and adjusting the pH to from 7 to 8. The temperature of the reaction is preferably reflux temperature at atmospheric pressure but temperatures as much as 50° C. below reflux may be used if desired.

The reaction should be carried out in an aqueous medium using sufficient water to render the reaction medium fluid. An excess of water may be used and the excess removed at the end of the reaction.

For preparing laminates, the syrup obtained at the end of the reaction may be used directly but generally the viscosity is too high at the desired solids content if water is the only solvent. A more usable viscosity is obtained if the aqueous solution is modified by the inclusion of from 20 to 30 parts of a lower aliphatic monohydric alcohol containing from 1 to 8 carbon atoms for every 100 parts by weight of water. The solids content of the laminating syrups should range from 40 to 60% by weight.

The amount of resin used in paper laminates will vary according to the properties desired. A deposit of 35–70% by weight of resin in and on the paper is sufficient for most purposes. In preparing the laminates for the flow tests described above, a resin pickup of from 60 to 65% is required.

The resins of this invention can be cured to an insoluble infusible state by heat at temperatures between 120 and 160° C. preferably under substantial pressure. The physical and chemical properties of the cured resin are equivalent to melamine-toluene sulfonamide-formaldehyde resins unmodified by ammeline in all respects except the greatly increased flow.

Due to the light color of these resins, they are particularly valuable for use in preparing decorative laminates in which a decorative surface sheet is laminated to a solid or laminated core. Most frequently, the core consists of a laminate made from a plurality of paper plies bonded with a thermosetting resin such as, for example, a phenolic or alkyl resin. In some cases, the core is a solid block of wood and in others it is the so-called hardboard which comprises wood waste bonded with a thermosetting resin under high pressure. The decorative sheet may be of paper, or various textile materials such as cotton, glass, nylon, vinyl resin, etc. fabrics.

For example, a decorative laminate may be prepared as follows:

Impregnate eight sheets of kraft paper with a standard phenolic laminating varnish. Impregnate one sheet of bleached kraft paper having a design printed thereon with the syrup of Example I. Impregnate a second sheet of bleached kraft paper carrying no design with the syrup of Example I. Dry the impregnated sheets to remove excess volatiles. Superimpose the eight sheets one on another to form an initial assembly. Place the printed sheet on top of the initial assembly and the unprinted sheet on top of that. Laminate the assembly under 1000 p. s. i. pressure at 150° C. for 30 minutes. The product is an attractive laminate, the topmost layer of which displays the decorative print unmarred by color due to the laminating resin and having superior gloss and abrasion resistance.

In decorative laminates of this type, the topmost layer is thin enough to be substantially transparent after laminating and serves mainly as extra protection for the printed surface.

What is claimed is:

1. A co-condensation product of one mol of melamine, from 2 to 5 mols of formaldehyde, from 0.1 to 1 mol of toluene sulfonamide and from 0.0006 to 0.006 mol of a material taken from the group consisting of ammeline, ammelide, cyanuric acid and mixtures thereof.

2. A product as in claim 1 wherein the material is ammeline.

3. A product as in claim 1 wherein the material is ammelide.

4. A product as in claim 1 wherein the material is cyanuric acid.

5. A product as in claim 1 wherein the material is a mixture of cyanuric acid and ammelide in which the ammelide constitutes about 20% by weight of the mixture.

6. A process of preparing a high flow melamine resin which comprises reacting one mol of melamine with from 2 to 5 mols of formaldehyde and from 0.001 to 0.006 mol of a compound taken from the group consisting of ammeline, ammelide, cyanuric acid and mixtures thereof at a pH of from 8 to 10 and at a temperature ranging from reflux temperature to 50° C. below reflux temperature at atmospheric pressure, adding to the reaction product from 0.01 to 1.0 mol of toluene sulfonamide, adjusting the pH to from 7 to 8 and continuing the reaction at from reflux temperature to 50° C. below reflux temperature at atmospheric pressure.

7. A laminate comprising a plurality of laminae impregnated and bonded with a co-condensation product of one mol of melamine, from 2 to 5 mols of formaldehyde, from 0.1 to 1.0 mol of toluene sulfonamide and from 0.001 to 0.006 mol of a compound taken from the group consisting of ammeline, ammelide, cyanuric acid and mixtures thereof, said co-condensation product having been cured to an insoluble infusible state under heat and pressure during the process of preparing the laminate.

8. A laminate comprising a plurality of laminae at least the topmost layers of which are impregnated and bonded with a co-condensation product of one mol of melamine, from 2 to 5 mols of formaldehyde and from 0.0006 to 0.006 mol of a material taken from the group consisting of ammeline, ammelide, cyanuric acid and mixtures thereof, said co-condensation product having been cured in situ in the laminate to an insoluble infusible state under heat and pressure.

References Cited in the file of this patent

UNITED STATES PATENTS 2,614,091　Bauer _____ Oct. 14, 1952